(12) United States Patent
Faust et al.

(10) Patent No.: US 7,048,657 B2
(45) Date of Patent: May 23, 2006

(54) BELT-DRIVEN CONICAL-PULLEY TRANSMISSION

(75) Inventors: Hartmut Faust, Bühl (DE); Eric Müller, Kaiserslauten (DE); Klaus Scheufele, Fort Louis (FR); Werner Gruca, Memprectshofen (DE)

(73) Assignee: Luk Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 11/036,638

(22) Filed: Jan. 15, 2005

(65) Prior Publication Data

US 2005/0192132 A1   Sep. 1, 2005

Related U.S. Application Data

(63) Continuation of application No. PCT/DE03/002373, filed on Jul. 15, 2003.

(30) Foreign Application Priority Data

Jul. 15, 2002 (DE) ................................. 102 31 790

(51) Int. Cl.
*F16H 59/00*   (2006.01)
(52) U.S. Cl. .......................................... 474/18; 474/28
(58) Field of Classification Search .................. 474/17, 474/18, 28, 46, 70, 8; 477/45–48
See application file for complete search history.

(56) References Cited

U.S. PATENT DOCUMENTS

| | | | | | |
|---|---|---|---|---|---|
| 5,342,247 | A | * | 8/1994 | Adriaenssens | 474/18 |
| 5,427,578 | A | * | 6/1995 | Iijima | 474/18 |
| 5,439,419 | A | * | 8/1995 | Yamada et al. | 474/18 |
| 6,234,925 | B1 | | 5/2001 | Walter | 474/18 |
| 6,336,879 | B1 | * | 1/2002 | Schmid et al. | 474/28 |
| 6,361,456 | B1 | * | 3/2002 | Walter | 474/18 |
| 6,361,470 | B1 | | 3/2002 | Friedmann et al. | 477/37 |
| 6,565,465 | B1 | * | 5/2003 | Nishigaya et al. | 474/28 |
| 6,669,588 | B1 | | 12/2003 | Schmid | 474/18 |

FOREIGN PATENT DOCUMENTS

| | | |
|---|---|---|
| DE | 198 57 710 A1 | 6/1999 |
| DE | 100 25 880 A1 | 11/2000 |
| DE | 101 60 865 A1 | 6/2002 |

* cited by examiner

Primary Examiner—Marcus Charles
(74) Attorney, Agent, or Firm—Alfred J. Mangels (57) ABSTRACT

A transmission with a drive side and an output side conical disk pair. One conical disk pair includes a fixed disk carried by a shaft, a movable disk non-rotatably connected with and axially movable relative to the shaft, and a support ring axially attached to the shaft adjacent a back side of the movable disk. A pressure chamber between the support ring and the back side of the movable disk is supplied with hydraulic pressure medium through a passage in the shaft that opens to the surface of the shaft. An end region of the movable disk when moved along the shaft passes over the opening at a maximum spacing of the movable disk from the fixed disk, and a hydraulic medium connection exists between the passage and the pressure chamber through drainage slots between an inner surface of the movable disk and the peripheral surface of the shaft.

27 Claims, 5 Drawing Sheets

Prior Art

BELT-DRIVEN CONICAL-PULLEY TRANSMISSION

CROSS-REFERENCE TO RELATED APPLICATION

This is a continuation of International Application Serial No. PCT/DE2003/002373, with an international filing date of Jul. 15, 2003, and designating the United States, the entire contents of which is hereby incorporated by reference to the same extent as if fully rewritten.

BACKGROUND OF THE INVENTION

1. Field of the Invention

The invention concerns a belt-driven conical-pulley transmission with a drive side and an output side conical disk pair.

2. Description of the Related Art

Belt-driven conical-pulley transmissions are recently increasingly being used in passenger cars. They not only make an increase in comfort possible, but also a decrease in fuel consumption. In order to expand the spectrum of use of belt-driven conical-pulley transmissions, intensive development efforts have been undertaken recently with respect to their capacity to transmit torque.

Figure 5:
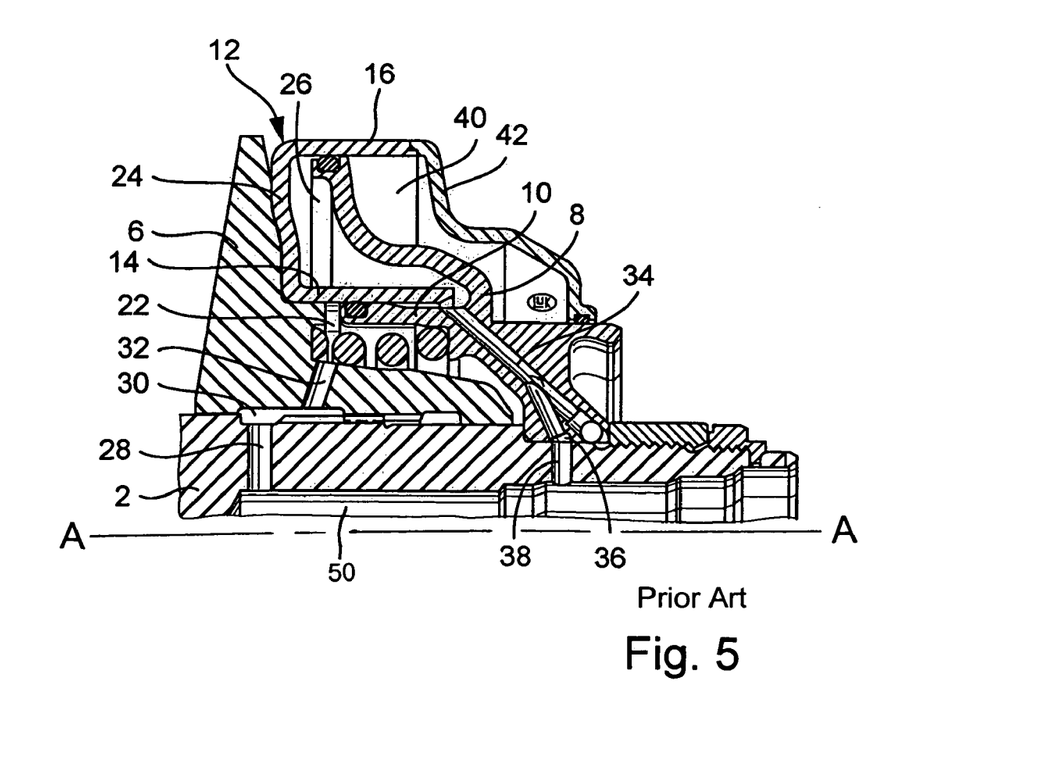
FIG. 5 an already explained axial half section of a part of a known belt-driven conical-pulley transmission.

FIG. 5 depicts the upper half of a half section through an already known belt-driven conical-pulley transmission. A shaft 2 of a conical disk pair of a belt-driven conical-pulley transmission, which has an axis A—A, is preferably constructed in one piece with a fixed disk that is not represented. A conical disk designated as movable disk 6 is non-rotatably and axially displaceably arranged on the shaft 2 at a distance from the fixed disk. A support ring 8 is rigidly connected with the shaft 2 at a distance from the back side of movable disk 6, from which an axially oriented, cylindrical annular wall 10 projects in the direction toward conical disk 6 in a radially central region. An annular pot-like wall element 12 lies on or is attached on the radially outer area of the back side of the movable disk 6, which has radially inwardly and outwardly axially running, cylindrical annular walls 14 and 16. The inner annular wall 14 is in sealed off sliding contact with the annular wall 10, and the outer annular wall 16 is in sealed off sliding contact with the outer periphery of the support ring 8. In this way, an inner pressure chamber 22 is formed between the shaft 2 and the conical disk, as well as the annular walls 10 and 14, and an outer pressure chamber 26 is formed between annular walls 10, 14 and 16, as well as the floor 24 of the wall element 12 and the support ring 8.

The pressure medium supply of the inner pressure chamber 22 takes place through an axial passage 50 constructed in the shaft 2, which opens through a radial passage 28 of the shaft 2 into a space 30, which is constructed between the shaft 2 and the movable disk 6, and is connected with pressure chamber 22 through a passage 32 formed in movable disk 6. The axial length of the space 30 is such that a pressure medium connection exists between passage 28 and passage 32 over the entire adjustment path of the movable disk 6. The space 30 advantageously borders on a spline not represented in detail, through which the rotationally fixed and axially displaceable connection between movable disk 6 and the shaft 2 takes place.

The outer pressure chamber 26 is connected with an axial passage of shaft 2 through a channel 34 formed in the support ring 8, an annular channel 36 and a radial passage 38 formed in shaft 2, which is separated from the axial passage 50 that is connected with passage 28.

This way, the two pressure chambers 22 and 26 can be acted upon independently of each other by means of a pressure medium, so that the movable disk 6 can be moved in the direction of the not represented fixed disk.

A centrifugal oil chamber 40 is formed between the annular wall 16, a hood 42 lengthening the annular wall 16, and the back side of the support ring 8, which serves in an inherently known manner to compensate for rotational speed influences upon the pressures acting in chambers 22 and 26.

A problem in relation to the pressure medium supply of the inner pressure chamber 22 consists in that the passage 32 of movable disk 6 constructed as a transverse bore hole, or the space 30, which in accordance with FIG. 5 is sealed off merely through a single sealing gap toward the left of the not represented fixed disk, which is constructed between the outer periphery of shaft 2 and the inner periphery of conical disk 6. In practice this means comparatively high leakage losses, especially if the pressure in pressure chamber 22 is high.

Figure 6A:
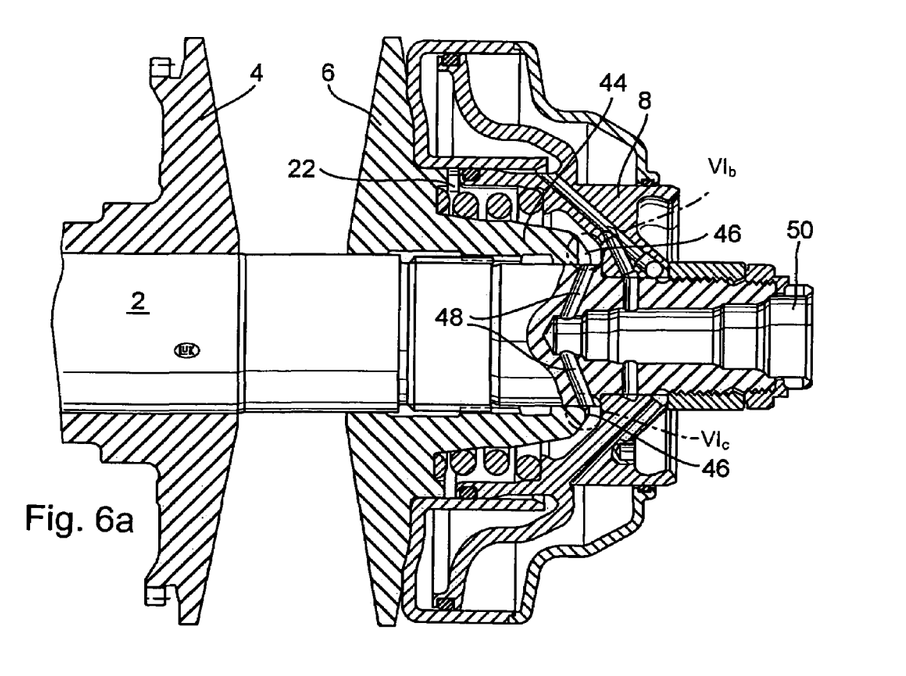
FIG. 6a an axial section of a conical disk pair with an altered realization in relation to FIG. 5.
Figure 6B:
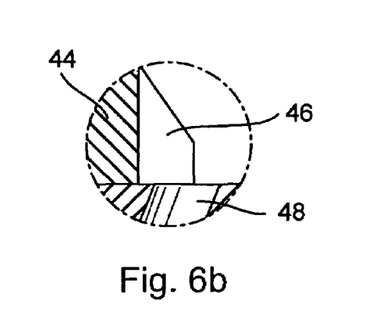
Figure 6C:
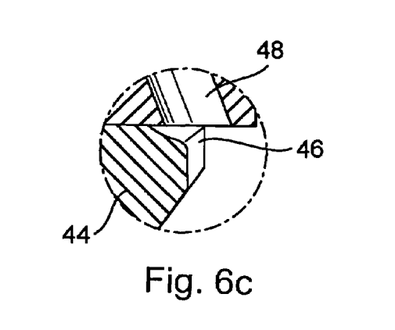

To remedy this, the construction was somewhat modified. FIG. 6 illustrates an axial section through a conical disk pair of a modified belt-driven conical-pulley transmission, whereby in FIG. 6, the fixed disk 4 preferably constructed in one piece with the shaft 2 is also represented. Only the regions essential to the explained modification are provided with reference numbers in FIG. 6 for the sake of clarity.

As opposed to FIG. 5, the radially inner pressure chamber 22 formed in movable disk 6 is not supplied through a radial passage 32 formed in movable disk 6 in the entry region of a collar 44 of the movable disk 6 in the embodiment in accordance with FIG. 6, but the end region of the collar 44 of the fixed disk 6 facing the support ring 8 is provided with an overall radially running groove 46, whereby the geometrical arrangement is such that when the movable disk 6 is completely slid to the right in accordance with FIG. 6, groove 46 overlaps an overall radially running passage 48 of the shaft 2, so that a pressure medium connection between an axial passage 50 of the shaft and the pressure chamber 22 exists continuously.

The section C of FIG. 6 illustrates an embodiment, in which the groove 46 is constructed as a simple straight groove in the front end of the collar 44, which can already be forged or milled into the half-finished product of the conical disk 6.

A modified embodiment of the groove 46 is represented in the lower part of the image D, in which the groove 46 is constructed as an angle groove, the depth of which is radially inward directly great in reference to the diameter of the movable disk of the collar of the movable disk, or the collar of the movable disk, in order to assure the passage of the flow medium, and which is constructed with diminished depth towards the outside. In this way, the wear of the material is reduced.

Lower leakage losses to the intermediate space between the two conical disks 4 and 6 occur in the embodiment in accordance with FIG. 6 in comparison with the embodiment in FIG. 5, since, as is immediately apparent, the axial slot length to be penetrated by the flow is greater.

With higher mechanical loads of the movable disk 6 as they occur in connection with transmittable torques of, for example, over 350 Nm, the embodiments depicted no longer operate satisfactorily due to leakage losses and mechanical deformations and strains.

SUMMARY OF THE INVENTION

The invention is based upon the objective of refining a belt-driven conical-pulley transmission with a drive side and an output side conical disk pair, wherein a conical disk pair is arranged on a shaft and includes a fixed disk constructed in one or several pieces with the shaft, and a movable disk non-rotatably connected with and axially movable relative to the shaft. A support ring is axially fixedly attached on the shaft at a distance from a back side of the movable disk, and at least one pressure chamber is constructed axially between the support ring and the back side of the movable disk. The pressure chamber is supplied with a hydraulic pressure medium through one or more passages constructed in the shaft and opening into a peripheral surface of the shaft, and whose pressure for displacing the movable disk is changeable. The pressure chamber directly bordering on the shaft operates trouble free even at very high torques transmitted from the fixed disk, as well as guaranteeing oil supply from the shaft into the pressure cylinders of the conical disk pairs with simultaneous reduction of the stress upon the components, especially at very low temperatures.

The objective is accomplished with a belt-driven conical-pulley transmission with a drive side and an output side conical disk pair, in which in each case a conical disk pair is arranged on a shaft, possesses a fixed disk in one or several pieces with the shaft, and a movable disk is non-rotatably connected and axially displaceable with the shaft; it moreover has a support ring attached axially fixed on the shaft with a spacing from the back side of the movable disk; it possesses at least one pressure chamber constructed axially between the support ring and the back side of the movable disk, which is supplied with hydraulic medium through a passage formed in the shaft aperture in a peripheral surface of the shaft, whose pressure is alterable for movable the movable disk, accomplishing the objective in that an end region of an inner surface of the movable disk guided on the shaft passes over the aperture of the passage at its maximum distance from the fixed disk, and the hydraulic medium connection between the passage and the pressure chamber basically takes place through a drainage slot between the inner surface of the movable disk and the outer surface of the shaft.

It is advantageous to construct the movable disk with a collar ending in the end region in relation to the support ring. This way, a support length is attained over which the movable disk is braced on the shaft, so that tilting torques can be absorbed, which are applied to the movable disk as a consequence of forces acting from an endless torque-transmitting means of the belt-driven conical-pulley transmission.

Advantageously, the end region is ovally deformed as a consequence of the tilting torque acting from the conical disk. The formation of drainage slots is promoted by this oval deformation, through which the supply of pressure medium takes place.

Preferably the side of the aperture of the passage facing the support ring or the entire aperture is countersunk.

In an advantageous embodiment of the conical disk pair, the outer surface of the shaft and the end of the movable disk facing the support ring is provided with a bevel.

The incline of the bevel advantageously amounts to between 2° and 10°.

The incline of the bevel advantageously increases outwardly, that is, towards the support ring.

The length advantageously amounts to between 0.5 and 5 mm.

In a further advantageous embodiment, the bevel is executed as a curvature, which goes over into a cylindrical inner surface of the movable disk tangentially or with a bend.

A further advantageous realization of the invention provides that the shaft preferably has at least one radial passage bore hole provided with a countersink in the form of a bevel or curvature in the immediate vicinity of its tapering towards the seat of the support ring, and that simultaneously the support ring is provided with a circular groove at the place where the conical disk contacts. Alternatively, this groove can also be installed on an offset. In this way, a mitigation of the strength-side critical position occurs. Moreover, the costly and expensive reprocessing of the conical disk becomes unnecessary.

It is moreover advantageous, that a circular recess is present on the end of the collar of the conical disk, preferably in the form of a bevel or a crown. It is thereby significantly simpler to mount it, since the correlation of shaft bore hole and oil groove is unnecessary. This circular recess in the sealing support can already be provided during blank manufacture, which leads to considerable cost saving.

BRIEF DESCRIPTION OF THE DRAWINGS

The invention will be explained below on the basis of schematic drawings by way of example, and with further details.

They show:

FIG. 1b an enlarged detail of section Ia of FIG. 1a;

FIG. 2b a cross-sectional view taken along the line 2b-2b of FIG. 2a;

FIG. 6b an enlarged detail of section VI b of FIG. 6a;

FIG. 6c an enlarged detail of section VI c of FIG. 6a:

DESCRIPTION OF THE PREFERRED EMBODIMENTS

Figure 1A:
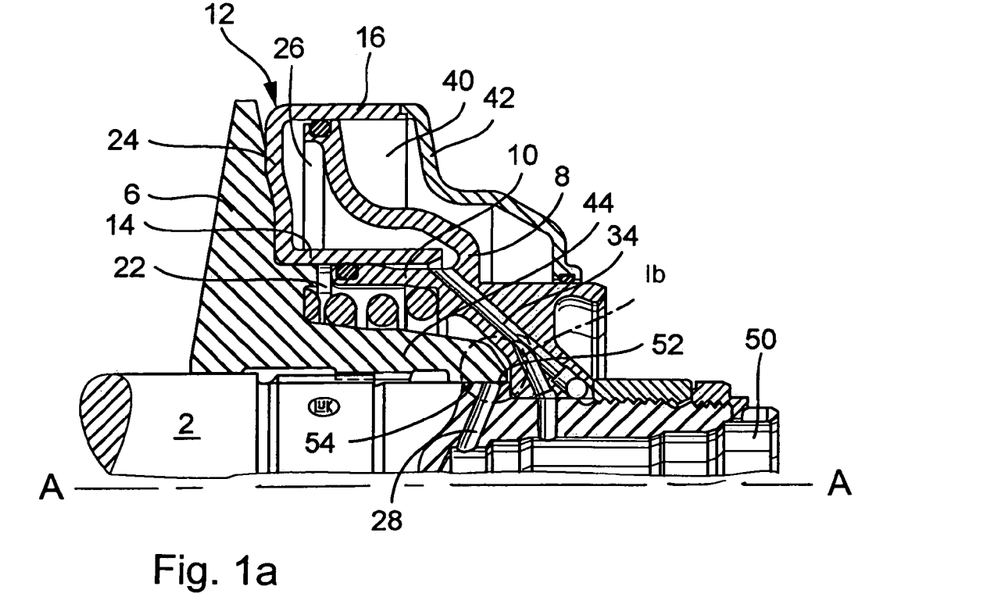
FIG. 1a an axial upper half section of a conical disk pair of a belt-driven conical-pulley transmission.

The same reference numbers are used in FIG. 1 as in FIG. 5, so that the already explained details do not need to be explained once again.

As opposed to the design in accordance with FIG. 5, the entire radial passage 28 of the shaft 2, which connects an axial passage 50 of the shaft 2 with the radially inner pressure chamber 22, is arranged in such a way that the aperture 52 of the entire radial passage 28 is passed over by the end region of the collar 44 of the movable disk 6, when the movable disk 6 is moved wholly to the right in accordance with FIG. 1.

Since the movable disk 6 and therewith also the collar 44 can be axially displaced in relation to shaft 2, there necessarily exists a play of up to about 50 μm between the inner surface of the movable disk 6 and the collar 44 guided on the outer surface of the shaft 2, for example the axially running inner surface 54 of the collar 44 and the outer surface of the shaft 2. A slight oval deformation, especially of the right side end of the collar 44, is added to this basically existing play, when tilting torques act upon the fixed disk 6 as a consequence of the contact pressure of the not represented endless torque-transmitting means. The necessarily existing annular slot between the collar 44 and the shaft 2, which is partially enlarged during tilting or oval deformation, ensures that the slot connection between the passage 28 and the collar 44, or the movable disk 6, is sufficient so that the passage 28 is connected through its aperture 52 and the slots forming over slot cross sections with the pressure chamber 22, and subjecting the pressure chamber 22 to pressure is possible. Satisfactory experimental results were achieved in practical operation, whereby the pressure buildup in the pressure chamber 22 is delayed in relation to the pressure buildup in the axial passage 50, for example in the order of magnitude of some 100 ms.

Figure 1B:
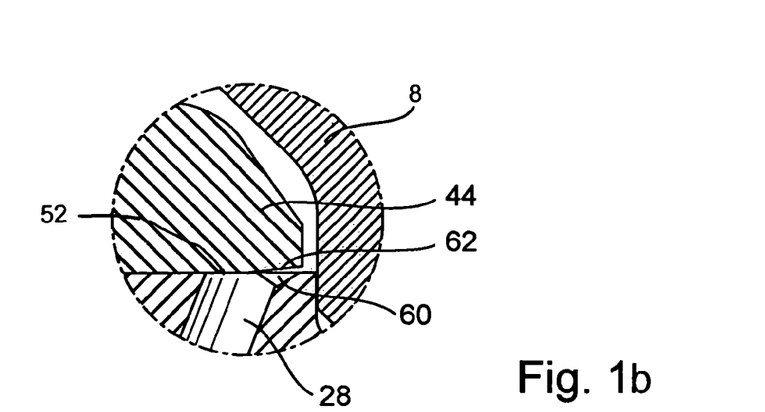

The enlarged section FIG. 1b illustrates an advantageous detail of the embodiment in accordance with FIG. 1, in which the cross sections existing between pressure chamber 22 and the passage 28 to reduce the delay of the pressure buildup are enlarged.

Figure 2A:
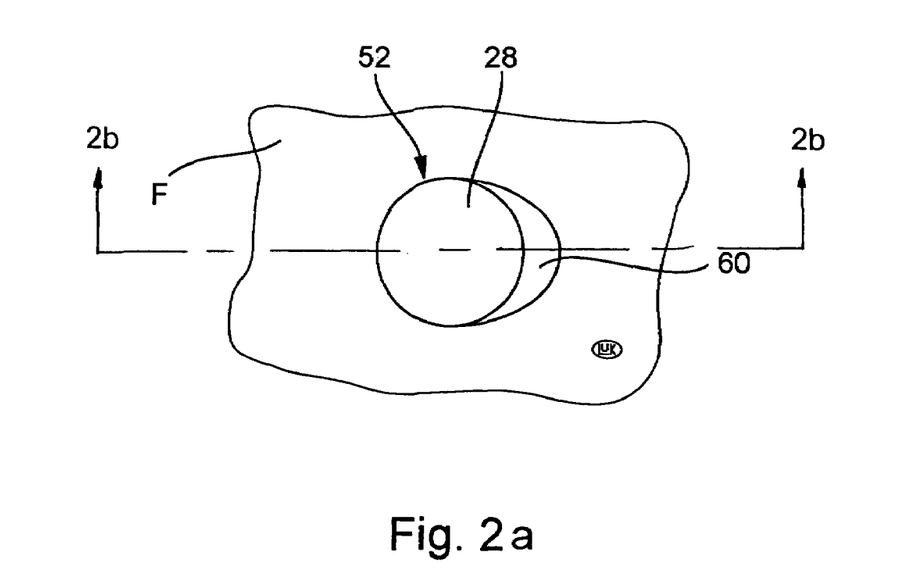
FIG. 2a an enlarged detail of FIG. 1.
Figure 2B:
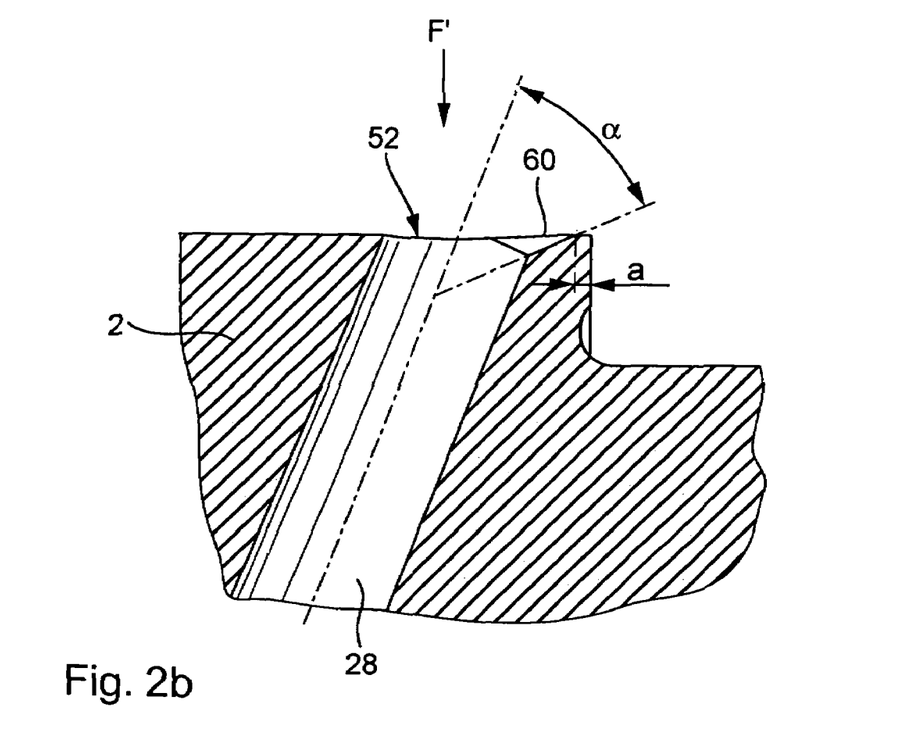

The passage 28, which normally is constructed as a simple radial bore hole, or a bore hole oriented inclined in relation to the radial direction, has on its side facing towards the movable disk 6 a countersink 60, which enlarges the slot passage cross section for the hydraulic medium, as is immediately apparent from enlarged section FIG. 1b. The same applies especially in connection with a slight bevel 62 or incline, with which the right side end of the movable disk 6, or from its collar 44, is constructed to avoid edge pressure when the movable disk 6 is tilted. The incline of such a bevel 62 in relation to the axial direction lies, for example, in the order of magnitude of about 2°. As is furthermore apparent in enlarged section FIG. 1b, the countersink 60 ends on the right side, axially approximately in an area which corresponds to the radial end surface of the collar 44 in its position when moved completely to the right. The angle α (FIG. 2b), which the bevel 60 forms with the axis of the passage 28, advantageously comes to about 45°. The bevel 60 ends at a distance a from a step of shaft 2 (FIG. 2b) on which the support ring 8 (FIG. 1) sits, whereby the support ring 8 forms a stop for the movable disk 6. The dimension a amounts, for example, to about 0.4 mm. FIG. 2a shows a view onto the aperture 52 of the passage 28 in the direction of the arrow F' of FIG. 2b.

Figure 3:
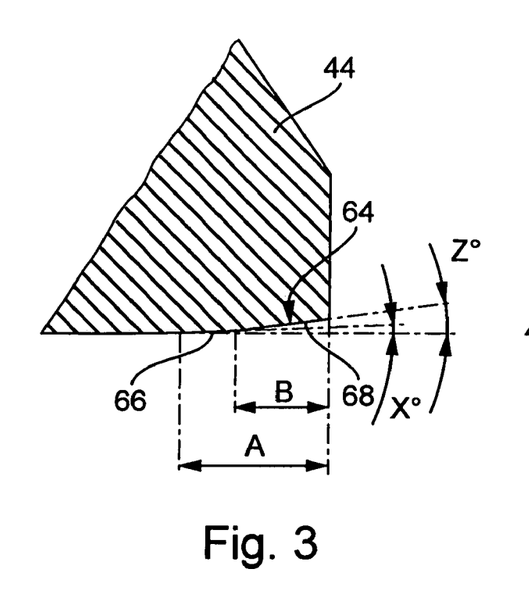
FIG. 3 an embodiment of a detail of FIG. 1.

FIG. 3 illustrates a detail of the construction of the end region of the collar 44.

A bevel 64 is formed at the end of the collar 44 of the movable disk 6, which has an incline (angle X) of ca. 2° in a first area 66, and then is inclined in a second area 68 at a greater angle Z relative to the axis A—A (FIG. 1), which is up to 10°.

The dimension A, that is, the distance between the beginning of the bevel 64 and the end of the collar 44, is ca. 2.5 mm. Dimension B, that is, the distance of the beginning of the second area 68 from the end of the collar 44 amounts to about 1.5 mm.

Figure 4:
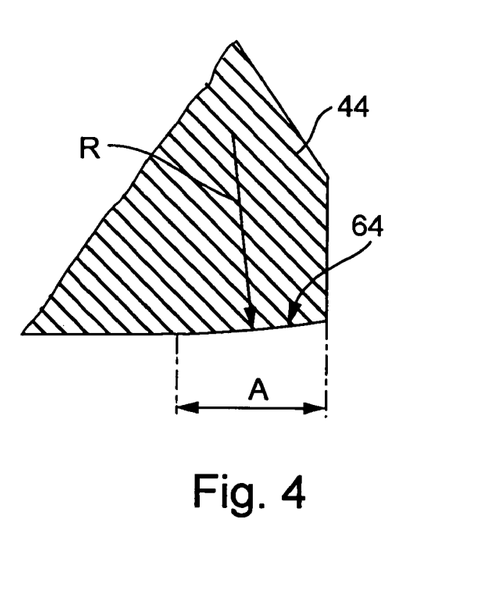
FIG. 4 a modified embodiment of a detail of FIG. 1.

FIG. 4 shows an embodiment modified in relation to FIG. 3, in which the bevel 64 is constructed in a rounded form, for example in the form of an arc of a circle with radius R, which begins at the distance A of about 3 mm from the axial end of the collar 44, and joins the axis-parallel cylindrical inner surface of the collar tangentially, or with a discontinuity.

Figure 7:
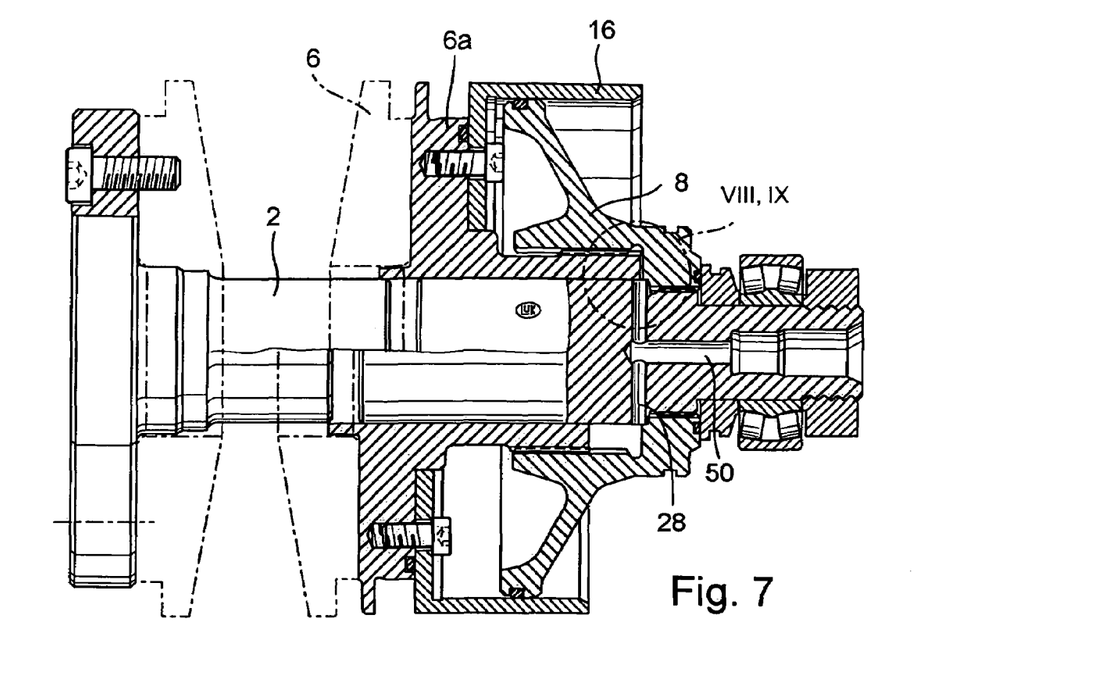
FIG. 7 a further refinement form of a conical disk pair above the axis of symmetry in the engaged position, and beneath the axis of symmetry in the disengaged position.

FIG. 7 illustrates a further structural embodiment of a conical disk pair and the support ring 8, or the cylindrical annular wall 16. In this arrangement, the conical disks are in each case separated. They respectively consist of the disk 6 and disk carrier 6a that are preferably screwed together. This structural form has the advantage, that in the event of an indication of wear of the disks 6 they can be detached from the disk carrier 6a in a simple manner, and can be exchanged for new disks 6.

Figure 8:
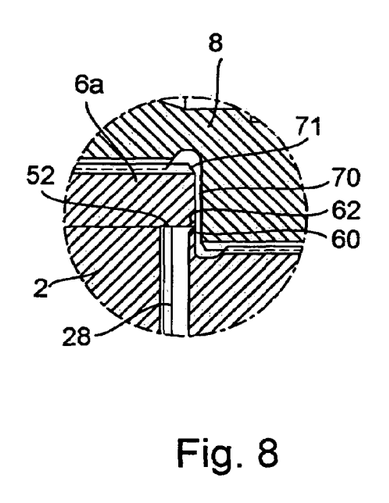
FIG. 8 section X of FIG. 7 with correspondingly constructed aperture of the passage.

FIG. 8 illustrates the view VIII of FIG. 7 in enlarged form with a solution of the aperture 52 of the passage 28. This aperture 52 is provided with a countersink or bevel 60 in this case, as is apparent in FIG. 1b and FIG. 2b. Since the end of movable disk carrier 6a defines with support ring 8 a radial groove 70 in the contact area to the passage 28, the pressure medium can flow from the passage 28 over the short intermediate space, which is formed by the two bevel surfaces 60 and 62, as well as through the radial groove 70 and the axial groove 71 into the pressure chamber 22.

Figure 9:
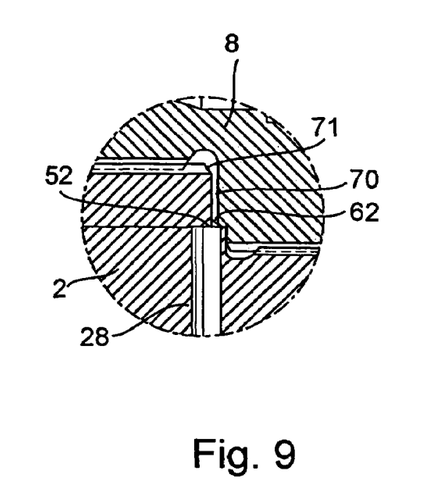
FIG. 9 section VIII, IX of FIG. 7 with a recessed support ring.

Another possibility of forwarding the pressure medium is apparent from the structural form in accordance with enlarged view IX of FIG. 7 as shown in FIG. 9. Hereby, the support ring 8 includes a recess over the passage 28. This way, it is guaranteed that the pressure medium can reach the pressure chamber 22 from the passage 28 directly through the radial groove 70 and the axial groove 71. The movable disk carrier 6a is provided with a bevel 62 in the contact area to the shaft 2 for enlarging the entry cross section, or for improving the flow behavior of the pressure medium.

It is assured with the described features, that sufficient slot cross sections are available in all operating conditions, through which the inner pressure chamber 22 is supplied with pressure medium.

The features described can be used individually, or in the most varied combination with one another.

The invention is not restricted to the conical disk pair with an arrangement of pressure chambers in accordance with FIG. 1 or FIG. 7. It is suited in particular for all types of pressure chambers in which a pressure chamber directly bordering on the shaft is supplied with pressure medium on the back side of the movable disk through the shaft, for example arrangements with only one pressure chamber, or also arrangements with inherently known pressure chamber arrangements in tandem construction.

The patent claims submitted with the patent application are drafting proposals without prejudice for attaining further reaching patent protection. The applicant reserves the right to claim still further combinations of features, which were previously disclosed only in the description and/or drawings.

References used in the dependent claims point to the further development of the object of the main claim through the features of the respective dependent claim. They are not to be understood, however, as a waiver of attaining an independent, objective protection for the combinations of features of the dependent claims referred to.

Since the objects of the dependent claims can form their own and independent inventions with respect to the state of the art on the priority date, the applicant reserves the right to make them into the object of independent claims or applications for division. They can furthermore also contain independent inventions, which have a configuration independent of the objects of the preceding dependent claims.

The embodiments are not to be understood as a restriction of the invention. Rather, numerous variations and modifications are possible in the frame of the present disclosure, especially such variants, elements, and combinations, and/or materials which are, for example, inferable by combination or transformation of individual features, or elements, or procedural steps in combination with those described in the general description and embodiments, as well as claims, and contained in the drawings for the specialist with respect to the solution of the objective, and lead to new objects, or new procedural steps, or sequences of procedural steps through combinable features, also to the extent, that they concern manufacturing, testing and work procedures.

What is claimed is:

1. A belt-driven conical-pulley transmission comprising: a drive side and an output side conical disk pair, whereby one conical disk pair is arranged on a shaft and includes a fixed conical disk carried by the shaft, a movable conical disk non-rotatably connected with and axially movable relative to the shaft, a support ring axially fixedly attached on the shaft at a distance from a back side of the movable disk, wherein the movable disk includes a collar facing the support ring and having an inner surface facing the shaft, at least one pressure chamber constructed axially between the support ring and the back side of the movable disk and which is supplied with hydraulic pressure medium through a passage constructed in the shaft and having an opening that opens into a peripheral surface of the shaft, wherein the pressure for displacing the movable disk is changeable, wherein when the movable disk is moved along the shaft toward the support ring an outer end region of the inner surface of the movable disk collar passes over the opening of the passage at a maximum spacing of the movable disk from the fixed disk, and wherein a hydraulic medium connection between the passage and the pressure chamber takes place over drainage slots between the inner surface of the movable disk collar and the peripheral surface of the shaft, and wherein the drainage slots are formed over at least a portion of the collar inner surface at the end region of the movable disk collar when the end region is radially shifted relative to the shaft as a result of a tilting torque operating on the movable disk, and a radial slot is formed between the movable disk inner surface and the shaft on a portion of the periphery of the shaft.

2. A belt-driven conical-pulley transmission according to claim 1, wherein the end region is ovally deformed as a result of a tilting torque operating on the movable disk.

3. A belt-driven conical-pulley transmission according to claim 1, wherein the end region lifts off axially from the support ring as a result of the tilting torque operating on the movable disk on a portion of the periphery of the shaft.

4. A belt-driven conical-pulley transmission according to claim 1, wherein at least a side of the opening facing the support ring is countersunk.

5. A belt-driven conical-pulley transmission according to claim 1, wherein the end region of the movable disk facing the peripheral surface of the shaft and the support ring includes a bevel having a predetermined axial length.

6. A belt-driven conical-pulley transmission according to claim 5, wherein the bevel has a length of between 0.5 and 5 mm.

7. A belt-driven conical-pulley transmission according to claim 5, wherein the bevel is a curved surface that joins a cylindrical inner surface of the movable disk.

8. A belt-driven conical-pulley transmission according to claim 7, wherein the curved surface has a radius of curvature between 5 and 50 mm.

9. A belt-driven conical-pulley transmission according to claim 7, wherein the curved surface extends between 1 and 8 mm along the axial length of the bevel.

10. A belt-driven conical-pulley transmission according to claim 7, wherein the curved bevel surface tangentially joins the cylindrical inner surface of the movable disk.

11. A belt-driven conical-pulley transmission according to claim 5, wherein the bevel is between 2° and 10° relative to the shaft peripheral surface.

12. A belt-driven conical-pulley transmission according to claim 11, wherein the bevel includes a second inclination adjacent the end region of the movable disk.

13. A belt-driven conical-pulley transmission according to claim 12, wherein the second inclination has a length between 20 and 80% of the predetermined axial length of the bevel.

14. A belt-driven conical-pulley transmission according to claim 1, wherein the shaft includes a reduced diameter portion that defines a step forming a seat for the support ring and at least one radial passage borehole in the shaft adjacent the seat of the support ring.

15. A belt-driven conical-pulley transmission according to claim 14, including a movable disk carrier, wherein the support ring includes a recess to receive an end of the movable disk carrier, and wherein the support ring includes a circular groove that faces the shaft.

16. A belt-driven conical-pulley transmission according to claim 14, wherein the borehole includes a countersink on each end side.

17. A belt-driven conical-pulley transmission according to claim 16, wherein the countersink is in the form of a bevel.

18. A belt-driven conical-pulley transmission according to claim 16, wherein the countersink has the form of a curvature.

19. A belt-driven conical-pulley transmission according to claim 1, wherein a circular recess is provided on the end of the collar of the movable disk.

20. A belt-driven conical-pulley transmission according to claim 19, wherein the circular recess has the form of a bevel.

21. A belt-driven conical-pulley transmission according to claim 1, including a movable disk carrier, wherein the support ring includes a recess to receive an end of the movable disk carrier, and wherein the support ring includes a circular groove that faces the shaft.

22. A belt-driven conical-pulley transmission comprising: a drive side and an output side conical disk pair, whereby one conical disk pair is arranged on a shaft and includes a fixed conical disk carried by the shaft, a movable conical disk non-rotatably connected with and axially movable relative to the shaft and including an end region, a support ring axially fixedly attached on the shaft at a distance from a back side of the movable disk, at least one pressure chamber constructed axially between the support ring and the back side of the movable disk and which is supplied with hydraulic pressure medium through a passage constructed in the shaft and having an opening that opens into a peripheral surface of the shaft, wherein when the movable disk is moved along the shaft the end region passes over the opening of the passage at a maximum spacing of the movable disk from the fixed disk, wherein the pressure for displacing the movable disk is changeable, wherein the end region at an inner surface of the movable disk facing the shaft and the support ring includes a bevel having a predetermined axial length, wherein a hydraulic medium connection between the passage and the pressure chamber takes place over drainage slots between an inner surface of the movable disk collar and the peripheral surface of the shaft, wherein the bevel is between 2° and 10° relative to the shaft peripheral surface, and wherein the bevel includes a second inclination adjacent the end region of the movable disk collar.

23. A belt-driven conical-pulley transmission according to claim 22, wherein the bevel has a length of between 0.5 and 5 mm.

24. A belt-driven conical-pulley transmission according to claim 22, wherein the bevel is a curved surface that joins a cylindrical inner surface of the movable disk.

25. A belt-driven conical-pulley transmission according to claim 24, wherein the curved surface has a radius of curvature between 5 and 50 mm.

26. A belt-driven conical-pulley transmission according to claim 24, wherein the curved surface extends between 1 and 8 mm along the axial length of the bevel.

27. A belt-driven conical-pulley transmission according to claim 24, wherein the curved bevel surface tangentially joins the cylindrical inner surface of the movable disk.

* * * * *